Nov. 22, 1938. H. M. SUTTON ET AL 2,137,679
PROCESS OF SEPARATING A MASS OF SEEDS OF VARIED CHARACTERISTICS
Original Filed Jan. 26, 1934 5 Sheets-Sheet 2

Henry M. Sutton
Edwin G. Steele
INVENTORS

ATTORNEY

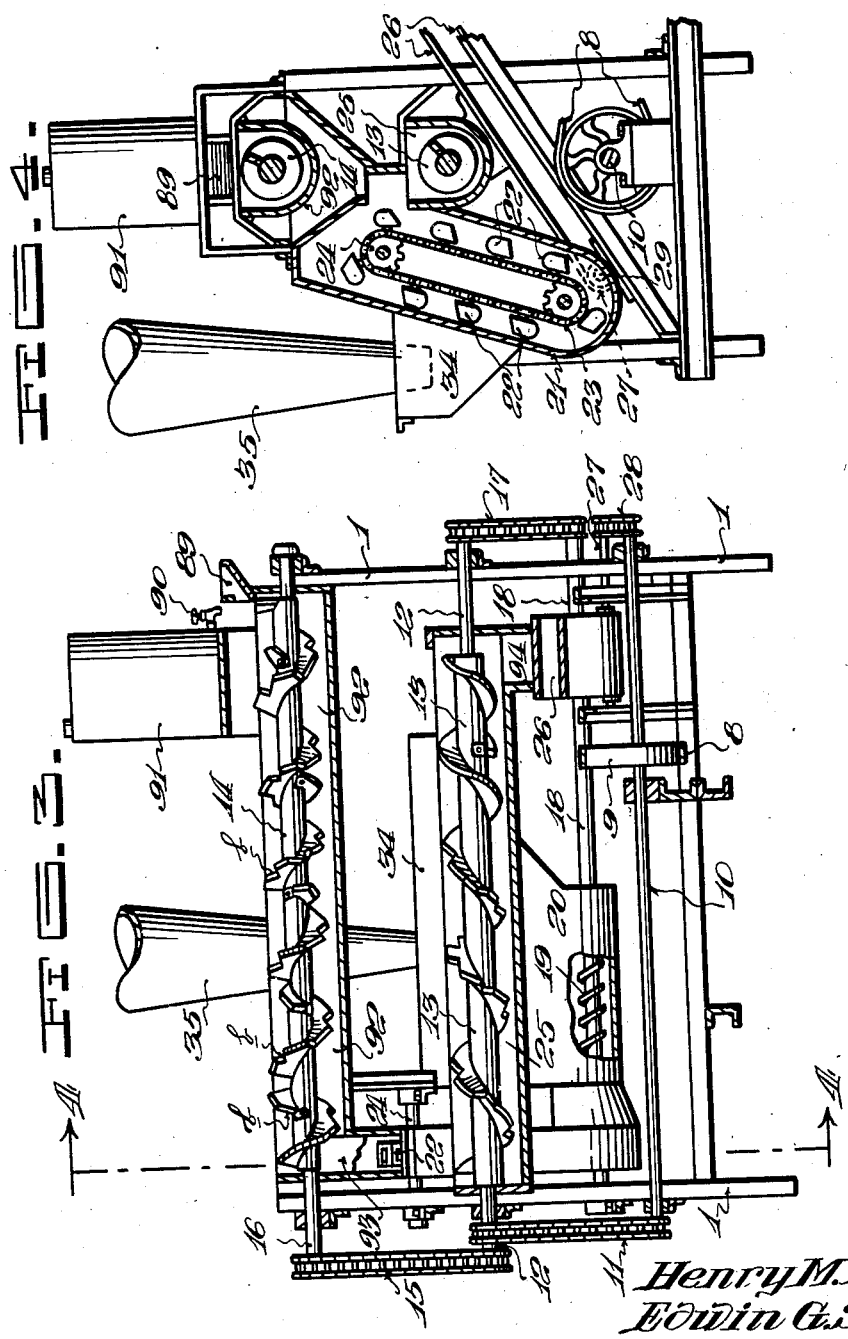

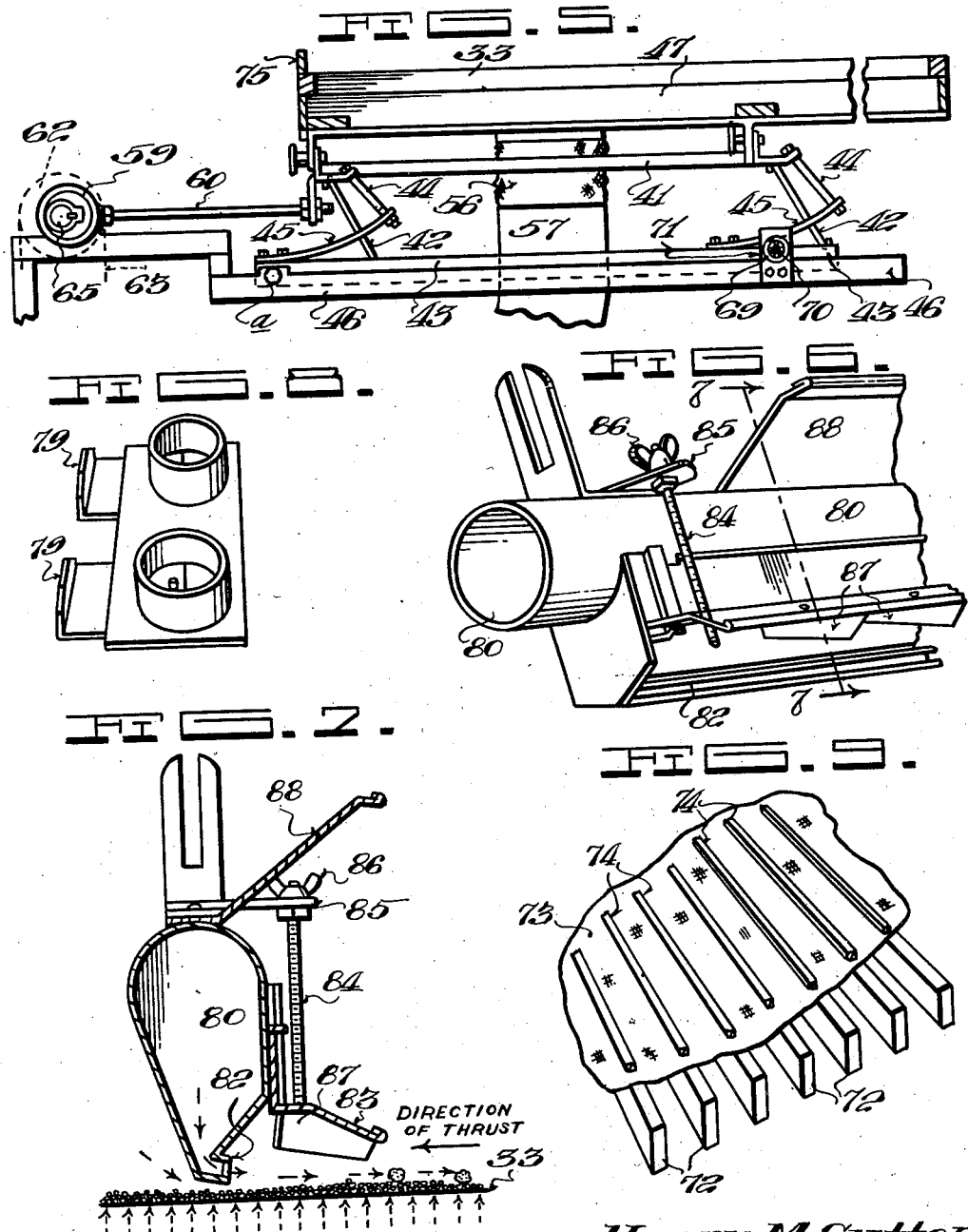

Nov. 22, 1938.  H. M. SUTTON ET AL  2,137,679
PROCESS OF SEPARATING A MASS OF SEEDS OF VARIED CHARACTERISTICS
Original Filed Jan. 26, 1934   5 Sheets-Sheet 5
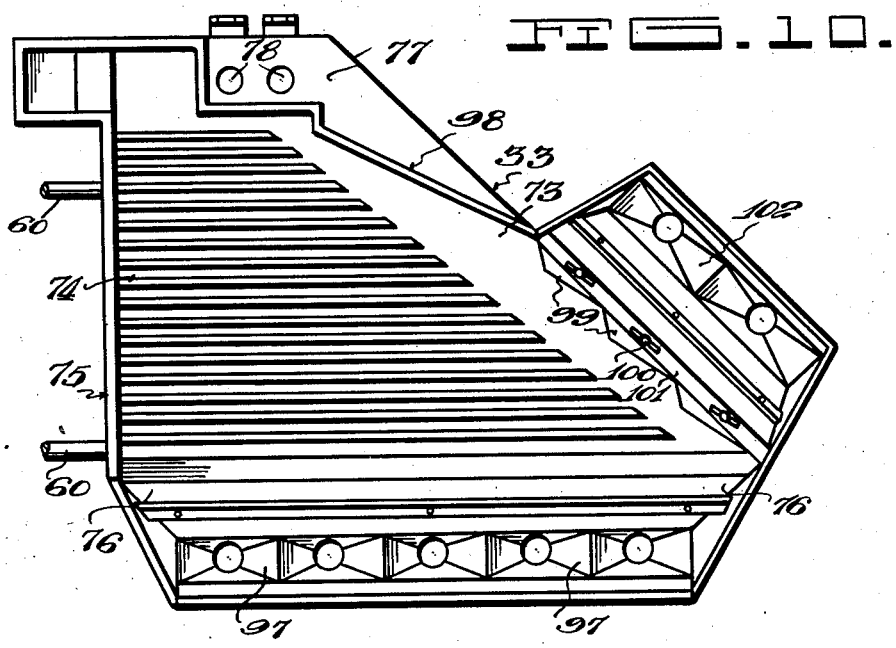
FIG.10.
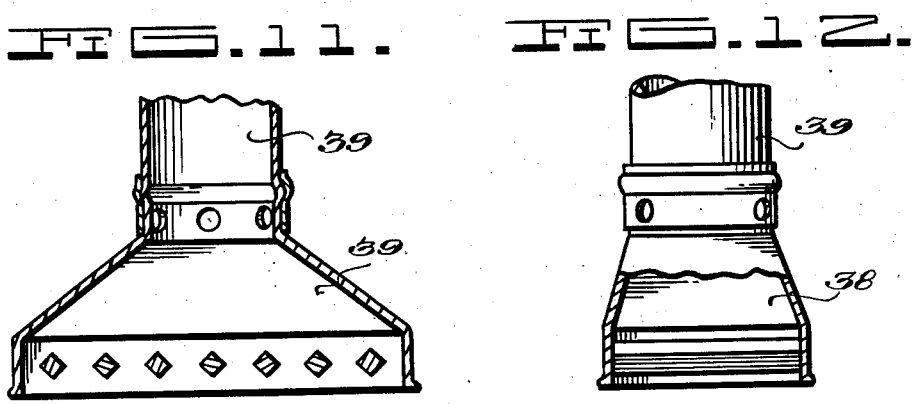
FIG.11.   FIG.12.
Henry M. Sutton
Edwin G. Steele
INVENTORS.
ATTORNEY Patented Nov. 22, 1938

2,137,679

UNITED STATES PATENT OFFICE 2,137,679

PROCESS OF SEPARATING A MASS OF SEEDS OF VARIED CHARACTERISTICS

Henry M. Sutton and Edwin G. Steele, Dallas, Tex.

Original application January 26, 1934, Serial No. 708,386. Divided and this application October 17, 1935, Serial No. 45,443

5 Claims. (Cl. 209—4)

This invention relates to a process of separating a mass of seeds of varied characteristics and it has particular reference to the separation of seeds that release a mucilaginous material when moistened with a suitable liquid from others of a non-mucilaginous bearing character, or from those on which this mucilaginous coating does not appear for a considerable period of time after moistening.

The objects of the present invention include, first: The step of moistening a mass of seed, preferably with water, containing both mucilaginous ones with others that are not; mixing both while in the moistened state with a suitable dry comminuted material such as wood sawdust, or any suitable dry pulp that will be capable of adhering to the mucilaginous coating on the seed; feeding the mixed mass in a current of air to a separating air cushioned surface capable of stratifying the mass initially at the point of feed, thereby permitting the heavier particles to settle and come into contact with the floor of said surface; then the next lighter seed to report in a stratum above this and so on until the top stratum will contain nothing but a surplus of the coating of comminuted material.

The invention is further effective in not only drying the good seed stock by passing a gentle stream of air therethrough during separation but likewise leaves the same in a clean, polished condition by virtue of the intimate contact therewith of the coated seed prior to separation.

The invention further embodies the step of immediately removing the surplus stratum of coating material at the point of feed to the separating surface as soon as stratified by a suitable suction device that conveys it back to the original feeding element from which it is delivered to the moistened feed stock; simultaneously therewith the moisture absorbed from the moistened seed is automatically removed from it in the current of air by which it is being conveyed so that when it is again presented to the moistened seed, it is in practically a dry condition.

Another object of the invention includes the step of separating the stratified elements of the mass into zones of material of varied characteristics, such as sand dirt clods, good seed and the noxious coated seed as well as other noxious or foul seed, and then these separate zones are separately collected from different points from this separating surface, as individual products.

A further and important object of the invention is the step of applying a slight draft of air from pneumatic blowing skimmers, located near the feeding point of the material to said surface, and designed to deliver a current of air in a direction opposed to the forward movement of the mass upon said surface, said current of air however, to act only upon the remaining upper stratum of material which contains such floating elements as the noxious coated seed which are made relatively lighter, due to the applied coating and other worthless elements of the mass so as to confine them to a zone which will be made to report from a separating surface at a point approximately opposite to the point of feed to said surface and separately collecting this product from the good seed, which is made possible by the increased area presented to the uplifting air currents by coating.

Still another object of the invention is to provide a method to effect a highly practical separation of pest seed from seed having desirable characteristics by the association therewith of a material capable of adhering to the pest seed without the necessity of excessive wetting, which would require special drying equipment. Not only does the present invention avoid excessive wetting, but due to the absorbent quality of the coating material employed, combined with the drying effect of the air currents upon the seed and the coating material, a dual advantage is obtained, that of preventing discoloration of and other ill effects upon the seed and prepares the coating material for immediate re-use without waiting for the same to become sufficiently dry to render the same suitable for continued use or without extraneous means to effect such drying.

While the herein defined process is intended for the separation of such mucilaginous bearing seed as buckhorn, plantain, bracted plantain and others of a similar nature from those of the clover family or other good seed, it is also capable of separating simultaneously therewith other noxious weed seed from good seed of any kind simply by their difference in specific gravity where such difference exists, without regard to any artificially applied coating, which thus enables the operator to make numerous separations simultaneously with the separated coated seed of other pest seed in a single unit from a seed stock which would otherwise require numerous other machines or operations to complete.

With the foregoing objects as paramount, the invention has particular reference to the novel steps of the method made possible by the apparatus, the latter being set forth in our co-pending application, filed January 26, 1934, Serial No. 708,386. In the drawings:

Figure 3 is a side elevation of the coating apparatus, partly in section.

Figure 4 is an end elevation of the coating apparatus, partly in section and taken on lines 4—4 on Figure 3.

Figure 5 is a side elevation, partly in section, showing the running gear of the pneumatic separating table.

Figure 6 is a fragmentary perspective view of a pneumatic blowing bar or skimmer.

Figure 7 is a vertical section on lines 7—7 on Figure 6.

Figure 8 is a perspective view of air gates controlling the air for the pneumatic blowing bar.

Figure 9 is a perspective view fragmentarily showing the deck construction of the pneumatic separating table.

Figure 10 is a plan view of the deck of the pneumatic separating table with the pneumatic blowing bars omitted.

Figure 11 is a view in vertical cross section of the hood employed to collect excess coating material from the deck of the pneumatic separating table.

Figure 12 is a similar view with portions broken away showing the end of the hood shown in Figure 11.

Figure 16 is a perspective view of the flexible boot and feed hopper to deliver feed to the separating surface.

Figure 1:
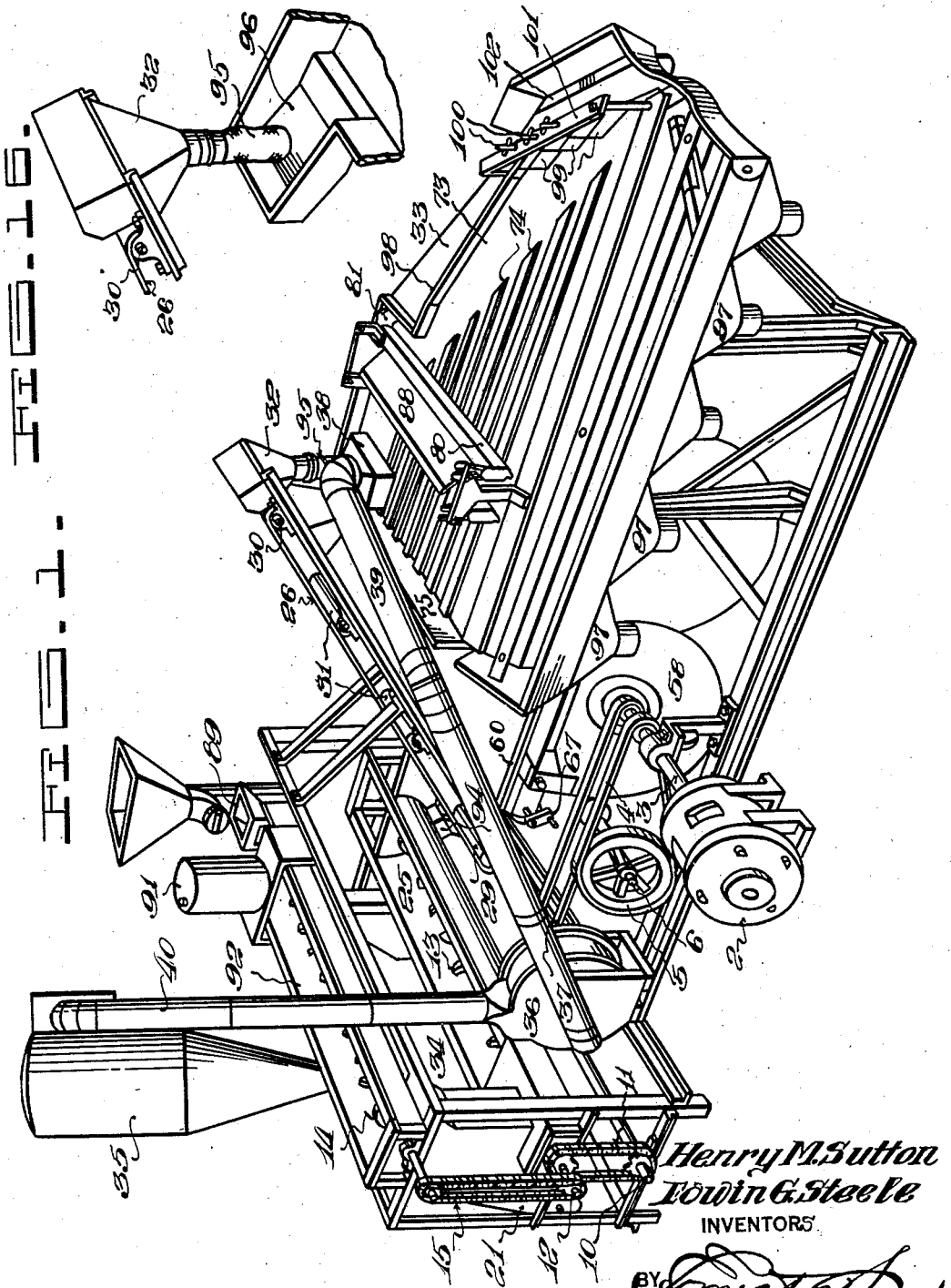
Figure 1 is a perspective view of the complete assembly showing a pneumatic separating table, with means for coating the seed and means for collecting and returning the excess coating material for re-use.

Continuing with a more detailed description of the drawings, that part of the invention dealing with the preliminary preparation of the seed stock prior to actual separation will first be described. Accordingly, reference is primarily made to Figures 3 and 4, in which this mechanism is shown as being supported by the frame 1. Power is supplied for operating the complete machine from a common source, preferably an electric motor 2, shown in Figure 1. By means of a pulley mounted upon motor shaft 3, over which passes belt 4 and which extends over pulley 5, power is transmitted to shaft 6, which is the lower driving member of the speed-change transmission shown in Figure 13.

Figures 13, 14:
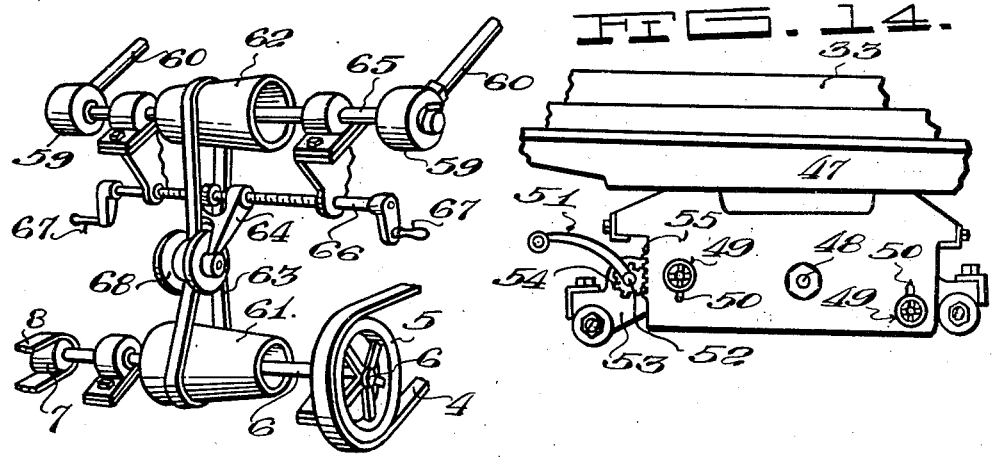
Figure 13 is a perspective view of the speed change and driving mechanism of the pneumatic separating table.
Figure 14 is a detail view fragmentarily showing the construction of the pneumatic separating table, illustrating means for adjusting the lateral inclination of the deck.
Figure 15:
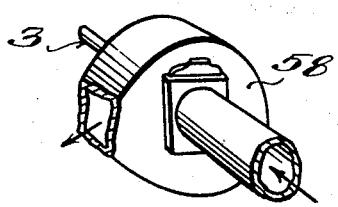
Figure 15 is a fragmentary perspective view of the separator fan, showing the air gate to control the air going to the separator deck.

On the opposite end of the shaft 6, as shown in Figure 13 is located a pulley 7 over which passes a belt 8, the latter also passing over pulley 9 on shaft 10. See Figure 3. Motion is thus transmitted to the shaft 10. Then by means of sprocket chain 11, passing over suitable sprocket wheels located on the ends of shaft 10 and 12, motion is further transmitted to the lower helicoid mixing and conveying member 13 which is mounted upon shaft 12. The helicoid or flight conveyor 14 is also driven from shaft 12 by means of the chain drive 15 engaging in suitable sprocket wheels located on the outer ends of shaft 12 and 16.

Shaft 12, by means of sprocket chain 17, passing over suitable sprocket wheels located on shafts 18 and 12, actuates the conveyor 19, operating in the trough 20. This conveyor advances the coating material such as wood sawdust and the like to a point to be elevated to effect association thereof with the seed to be separated. This detail will be explained presently.

An elevator housing 21 embraces a series of elevator buckets 22 mounted on chain 23. See Figure 4. The chain 23 is caused to move by sprocket wheels mounted on shaft 18 and short shaft 24. Being thus moved, the elevator buckets 22 are caused to discharge their contents into the conveyor through 25 in which operates the conveyor 13, the purpose of which will be set out later in this description.

Conveyor belt 26 is driven by shaft 10, which latter is the driven shaft and in turn drives short shaft 27 through chain drive 28. See Figure 3. This conveyor belt 26 surrounds pulleys 29 and 30 and is supported by idle rollers 31. See Figure 1. The belt 26, being arranged to operate on an incline, receives the mixed seed, which have been moistened and associated with the coating material, from the discharge of conveyor 13 and carries the mixture upwardly for discharge into the hopper 32 and onto the table deck surface 33.

In connection with the preparatory treatment briefly described in the foregoing, a pneumatic system is shown for returning the surplus coating material from the table deck surface 33 back to the original hopper 34 into which the material is fed from the container 35, suspended thereabove. Return of the coating material is accomplished by means of the suction fan 36 which is driven from the motor shaft 3 by means of belt 37, passing over a pulley mounted on the motor shaft, thence over a similar pulley located on the fan shaft, not shown. A suction hood 38 is connected to the suction side of the fan 36 by means of a pipe or conduit 39. The fan 36 conveys the material lifted by suction into the hood 38, through pipe 39, thence through pipe 40 into the container or collector 35, previously mentioned but what may be any of the well known type of dust collectors. As stated, the reduced lower end of the dust collector 35 discharges into the material hopper 34.

The foregoing being sufficiently explanatory as to the essential elements of the preparatory part of this mechanism, the separating elements of the invention will now be described and how these two mechanisms coordinate to produce the finished process.

The method of separation desired is preferably carried out on the running gear of any of our pneumatic tables shown in the prior art, such for instance, as that shown in Letters Patent No. 1,632,520, over which the present invention discloses several important improvements.

In order that the present invention may be better understood, the running gear shown in the aforementioned patent is substantially reproduced in Figure 5 of the annexed drawings. In this figure, the chassis 41 is mounted upon the toggle plates 42 which are inclined toward the rear or source of movement. These toggle plates are held securely in the toggle seats 43 by means of the bolts 44, passing through the ends of springs 45, which latter are in turn secured to the supporting frame 46. Adjustably mounted upon this chassis is an air chest 47, as shown in Figure 14, in which both rear and front are mounted on pivot bolts 48, to permit of adjustment of the lateral inclination of the air chest 47 and the deck surface 33, which is securely mounted thereon. The range of lateral inclination is secured by means of the hand wheels 49, the shanks of which pass through the slotted openings 50 into the chassis 41.

The proper inclination of the air chest 47 and deck surface 33 is secured by means of the crank 51, which is mounted on the short shaft 52, carried by the chassis member 53. The shaft 52 carries a pinion 54 which engages the rack 55 on the side of the chassis member 53. The air chest 47 is connected by a flexible intake boot 56 to the intake pipe 57 which supplies air from the fan 58, the latter being shown only in Figure 1.

The entire chassis, air chest and deck surface is reciprocated by means of the eccentrics 59, through rods 60, which connect to the chassis as shown in Figure 5 particularly. These eccentric rods 60 are driven by means of a variable speed-change transmission as shown in Figure 13.

This transmission consists of two reverse cone pulleys 61 and 62. The pulley 61 is driven by the pulley 5 (see Figure 1) by means of the belt 4, it being pointed out that the cone pulleys 61 are mounted upon the same shaft 6 which carries the large pulley 5. Motion is thus imparted to cone pulley 62 through belt 63, which is threaded through the belt shifter 64. Shaft 65 carrying the eccentrics 69 is thus rotated to impart reciprocating motion to the rods 60. The belt shifter 64 is mounted upon a threaded shaft 66 and by means of cranks 67 carried upon either end of this shaft 66, an operator on either side of the machine may adjust the position of belt 63 on the cone pulleys 61 and 62 to vary the speed of the upper cone pulley 62 and consequently predetermine the number of reciprocations of the table deck 33 and its associated elements. It is apparent that by moving the shaft 66 which carries the belt shifter 64, the idle pulley 68 carried by the belt shifter 64 and which rests upon the belt 63, will perform the actual operation of moving the belt 63.

For the purpose of providing for the end elevation of the air chest 47 and deck 33, the supporting member 2 of the chassis is hinged at a, as shown in Figure 5 so that the end opposite this hinge may be raised and held in the desired elevation by means of the hand wheel 69. This hand wheel 69 is threaded on a bolt 70, the latter passing through the slotted member 71. Thus when the chassis part 43 is raised, then the tightening of wheel 69 secures it in the desired elevation. The general table and deck surface as shown in Figures 9 and 10 as stated previously, is substantially the same in construction as that shown in Patent No. 1,632,520.

The lower portion of the deck shown in Figure 9 is secured to the air chest 47 and is built up with a number of longitudinal and relatively parallel ribs 72, approximately in line with the reciprocation of the eccentric rods 60 as shown in Figure 5. Over these ribs is disposed a porous textile material 73 of sufficient porosity that when air is supplied through the intake pipe 57, as shown in Figure 5, a certain amount of static pressure is maintained in the air chest 47. This porous textile material may be replaced by a sheet of finely punched metal, finely woven wire cloth or other foraminous material with equally as effective results, depending sometimes upon the nature of the material desired to be separated.

Riffles or partitions 74 are secured to the ribs 72 on the upper surface of the porous covering 73 by nails or screws passing through these riffles and pervious covering and entering the ribs 72 therebeneath.

The general arrangement of the riffles 74 is shown in Figure 10. In this figure it will be observed that the riffles all start from the back railing 75 and extend toward the pointed or delivery end of the table 33. These riffles are of unequal length, the shortest being near the feeding point of the material to the table 33 and the longest near and parallel with respect to the delivery side of the table at 76. In addition, the height of these riffles vary with their length; the butts where they terminate at the railing 75 have their greatest height and taper gradually to a feather edge where they terminate on the blank space of the table.

An impervious metal or wooden section 77 (see Figure 10) is mounted on the upper surface of the deck 33 and has openings 78 therein which lead into the air chest 47 under the pervious deck surface 33. The air passing through these openings is regulated by the two small sliding gates 79. See Figure 8. The purpose of these openings is to supply air to two pneumatic blowing bars or skimmers 80 (see Figures 6 and 7) and extending approximately at right angles across the deck surface in the manner shown in Figure 1.

The construction of these blowing bar skimmers is shown in Figures 6 to 8 inclusive and in Figure 7, which is a cross section of the pneumatic skimmer 80, the latter is shown as being a tubular member extending transversely across the table 33 and by a suitable elbow 81 (see Figure 1) communication is effected between the tubular member 80, through the openings 78 in the deck 33, with the air chest 47. The lower portion of the pneumatic skimmer 80 has a slot 82 underneath extending from one end to the other thereof and designed to deliver a current of air substantially horizontally over the top of the main bed of seed so as to affect those particles which occupy the upper stratum only. An example of this is shown in Figure 7. In front of the slotted opening 82, is placed a guard 83 which is attached to the member 80 and adjustably arranged so that it may be lowered or raised as the circumstances may demand by means of the threaded member 34 secured by its lower end to the guard 83 while its upper end passes loosely through the supporting member 85. A wing nut 86 bears upon the supporting member 85 and by rotating the same, adjustments of the guard 83 may be obtained.

As apparent in Figure 6 the guard 83 has a number of small deflectors 87 secured to its under surface and which are inclined diagonally downward toward the discharge side of the table deck surface 33. The object of these deflectors is to prevent a lateral discharge of an air current caused by an accumulation of air between the underside of the guard 83 and the table deck surface 33. The deflection of this air diagonally downward completely neutralizes this tendency.

In our prior Patent No. 1,632,520, we have shown a form of pneumatic skimmer which utilizes the air passing through the separating surface and the material upon it to repel or hold back certain undesirable elements floating on the bed of the seed stock being treated. The difficulty here was that when the pressure of air passing through the previous table deck surface exceeded a certain amount, the air would then blow both ways, forward and backward under these swimmers thereby disturbing the other elements undergoing separation.

In the pneumatic skimmers of the present invention, this objectionable defect is completely eliminated and air which is supplied from a separate source as well as that which passes through the deck surface itself is utilized to give a greater area of action upon the objectionable floating elements of the mass treated than would be possible with the older type of pneumatic skimmers or blowing bars. This is effected by means of applying a regulated draft of air through the slot 82 of the skimmer 80 so as to force rearwardly or toward the feeding discharge side of the table surface 33, the currents of air arising therethrough and thus preventing a forward draft under the skimmer bars which would otherwise be fatal to their successful operation.

The upper guard 88, shown in Figures 6 and 7, has no function other than to deflect toward the feed end or rear of the table 33, such fine dust particles as may arise in front of and between the two skimmers 80 and to prevent such for settling upon the other portion of the table surface where the clean seed are being graded and separated.

Having now outlined the coordination of the various parts of the invention, the process as carried out thereby will now be described. It is mentioned however, that it is not herein considered new to effect separation of buckhorn or other mucilaginous bearing seed from clover seed by simply wetting and coating with a comminuted material but the steps of the present process relating to actual separation to be hereinafter more specifically defined are new in the art, and which include the steps of depositing the mass on a mechanically actuated deck to effect separation by gravity, in stratifying the mass according to specific gravity of the elements of the mass by supporting the same on a cushion of air, in withdrawing superfluous comminuted material by suction for return to its source and simultaneously drying the same and in separately collecting the seed at different points as they emerge from the deck.

The seed of the mucilaginous bearing character to be separated from the non-mucilaginous bearing ones are fed from any suitable source of supply into the receiving hopper 89. See Figures 1, 3 and 4. Simultaneously therewith, a small trickle of liquid, preferably water, is fed through the spigot 90 from the supply tank 91. The liquid and the seed both entering the trough 92 of the conveyor unit 14 and by means of this conveyor 14, the moisture is thoroughly and adequately distributed over the surface of each individual seed of the mass. The conveyor 14 has cut away portions b in its flight, as apparent in Figure 3 to permit a better moisture distribution by causing a portion of the mass of seed to lag. The conveyor 14 delivers the dampened seed through the chute 93 into the end of the conveyor trough 25 immediately therebelow.

It has been stated previously that the hopper 34 receives coating material from the receptacle 35 thereabove and which material may be very fine sawdust or dry pulp of any suitable nature. The bucket elevator shown in Figures 3 and 4 picks up the coating material which is transferred from the hopper 34 to the point of reception by the elevator buckets 22 by means of the flight conveyor 19, and deposits the same into the trough 25 of the conveyor 13. Thus only the desired amount of coating material is deposited for association with the dampened seed mixture in the trough 25. Within the trough 25, the seed mixture and coating material is mixed and conveyed by the conveyor 14 to a point of discharge onto the belt conveyor 26. The material is deposited onto this belt through the chute 94, as apparent in Figures 1 and 3 and is elevated to a point of discharge into the receiving hopper 32, thence through the flexible conduit 95, shown in detail in Figure 16 and onto the table receiving feed pan 96, from which it is gently deposited onto the separating table 33.

The separation of the various elements of the mass is as follows. It will be noted from Figure 5 that the action of the eccentrics 59 is to move the air chest 47 and consequently the table separating surface 33 diagonally upward on the forward stroke and diagonally downward on the return stroke, due to the inclination of the toggle member 42.

When the mixture is deposited upon the table separating surface 33 after the manner described in the foregoing and a pressure of air supplied to the air chest 47 through the air conduit 57 which is connected to a suitable air supply source 58, the pressure of air within the air chest 47 causes the air to gently filter through the pervious deck surface 33. The action of the air under these conditions causes, first; the entire mass so delivered to be stratified, the heaviest elements sinking to the floor of the table, such, for instance, as sand and dirt clods; then the next and lighter elements, which will be the good sound seed; then next above that will be the coated seed, dead seed and other light foreign elements and finally the upper strata will contain nothing but the surplus coating material which is lighter in weight than all of the remainder of the stock. Then, by means of the suction hood 38, attached to the conductor pipe 39, this surplus coating material is drawn off of the table surface 33 by means of the suction action of the fan 36 as soon as stratified and returned through pipe 40 to the collector 35 from which it is again deposited into the coating material hopper 34 for re-use.

In the meantime, the reciprocating action of the table 33 propels the heavier elements of the mass forward from under the lighter ones, due to the fact that the upward and forward motion of the deck surface has more contact with the heavier elements than with the lighter ones, but with the top remaining stratum of coated seed and light particles practically not at all and since the table surface 35 is transversely inclined at right angles to the direction of reciprocation, so as to discharge its lateral content into the receiving hoppers 97, these lighter elements are entirely confined to the space between the pneumatic skimmers 80 and the rear walls of the table 75.

The importance of the pneumatic skimmers 80 is manifest at this point. Owing to the clinging nature of the coated elements of the mass and others to the stratum below them, they would report with the good seed, were it not for the pneumatic action of these skimmers delivering a draft of air rearward or toward the feed side of the table and opposed to their forward movement. The heavier elements of the mass pass underneath the pneumatic skimmers and report upon the table separating surface in zones of separated material. For instance, clods of dirt and sand hug the retaining or banking wall 98 and are discharged through one of the upper gate openings 99. These gates 99 are attached to a shank 100, pivotally mounted through the cross member 101, so that they can be opened as desired and these rock and sand clods trapped out in the hoppers 102 and in order that the good seed will report in hoppers 97 as mentioned previously.

Figure 2:
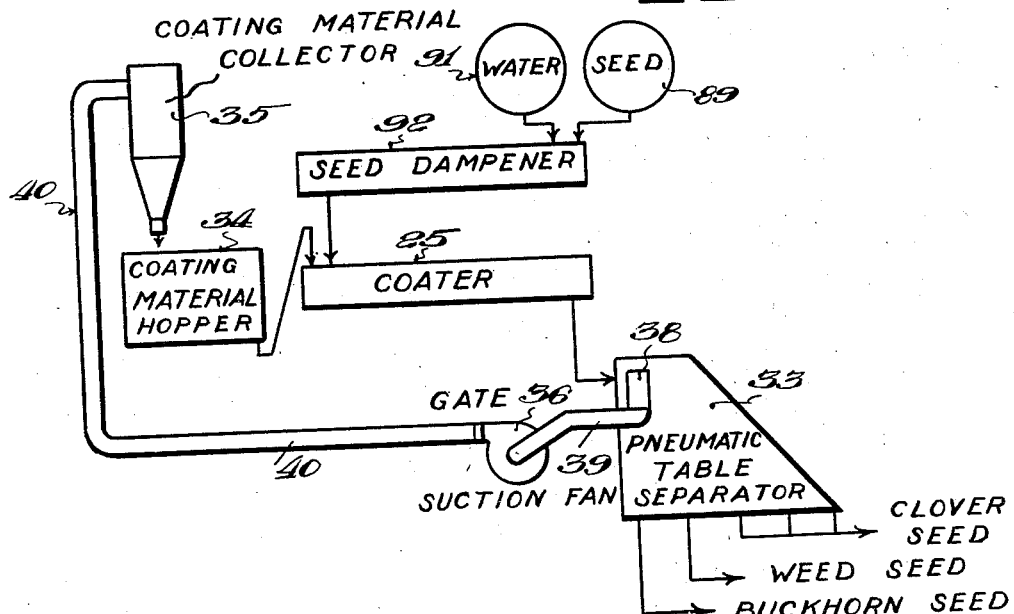
Figure 2 is a diagram showing the flow of material through the apparatus.

In Figure 2 is shown diagrammatically the path of the seed and of the complete mixture in the course of process according to the present invention. In this figure, like characters of reference are employed to designate the elements of the invention shown more or less symbolically to take the place of those illustrated more completely in the other views. In this figure it will be observed that the mixture of desirable and undesirable seed is fed into the "seed dampener", thence deposited into the "coater", into which is simultaneously delivered the coating material. The dampened seed with the coating material are then deposited upon the "pneumatic table separator" which effects separation of the seed according to their specific gravity. Surplus or excess coating material is removed from the separating table at the point of feed by suction and during its travel back into the coating material collector, it is dried to a sufficient degree as to reduce it to a condition for immediate re-use.

It is important, in separating seed by wetting and coating to insure against injury to the good seed by keeping them in a moistened state too long, which has been found to discolor them and thereby reduce their market value. The present process is effective, as stated, briefly in the preamble, in practically drying the good seed in the course of separation by the air to which the mass is subjected. Hence, the seed leave the separator deck in even a better condition than they were previous to separation, since they are cleaned and polished.

Manifestly, the construction shown is capable of considerable modification and such modification as is considered within the scope and meaning of the appended claims is also considered within the spirit and intent of the invention.

What is claimed is:

1. A process of continuously separating a mixed mass of bad mucilaginous from good non-mucilaginous seeds, characterized by initially subjecting the mass to the action of a moistening agent and in continuously associating therewith predetermined quantities of dry, comminuted material thus changing the specific gravity of said bad seed only, and finally depositing the mixture onto a drying and separating support which prevents any of said seed passing therethrough comprising a perforate plane so disposed that all the particles resting loosely thereon will be drawn in one direction by gravitational force, in simultaneously subjecting the mass to the effects of a cushion of air emanating from a source below said plane and to a force acting in a direction to intersect the cushion of air tending to cause the heavier of said seed to move in a direction other than that resulting from said gravitational force, in continuously removing from one zone of said support, the uncoated seed and from another zone, the coated seed and in continuously withdrawing by suction, superfluous comminuted material at the receiving point of said plane for return to its source.

2. A process of separating mucilaginous bad from non-mucilagious good seeds, characterized by initially subjecting the mixed mass of seeds to the effects of a moistening agent, in continuously adding to the moistened mass, predetermined quantities of dry, comminuted material, thus changing the specific gravity of said bad seed only and finally depositing all of the mass of coated and uncoated seed on an inclined, perforate plane whereby the mass will be drawn by the force of gravity in one direction, in simultaneously subjecting the mass to a reciprocatory action to stratify the same and to intersecting air forces to effect separation of the seed according to differences in specific gravity on said plane, in withdrawing excess comminuted material from a point on said plane from which moisture has been removed and in removing other moisture from said material during its course of travel back to its point of re-use.

3. The hereindescribed process of separating a mixed mass of bad and good seeds of varied characteristics in which certain of the seeds are capable of retaining particles of a comminuted material, characterized by initially changing the specific gravity of said bad seeds only by subjecting the mass of mixed seeds to the action of a moistening agent, in agitating the mass, in introducing into the mass continuously, predetermined quantities of a dry and finely divided material, in transferring the mass of seed and material to a point of separation and in withdrawing at said point, excess and partially dried material, in returning said material to its source for re-use and in drying the same enroute, in finally stratifying all the seed mass and subjecting same to forces including that of gravity and intersecting air currents to cause the seeds to report in separate zones according to differences in specific gravity for separate collection.

4. The hereindescribed process of continuously segregating from a mass of bad viscid, a mass of good non-viscid seeds characterized by exposing the viscidity of said first seed to a dry and finely divided material by first moistening the mixed mass of seeds and then in introducing in a continuous stream said finely divided material and thereby changing the specific gravity of said bad seed only, in finally depositing the mixture of all said seed onto an inclined, perforate plane whereby particles resting loosely thereon will be drawn in one direction by the force of gravity, in withdrawing from a point on said plane excess quantities of finely divided material in a semi-dried state and in returning said material to its point of re-use in a dried state, in subjecting the seed mass to intersecting currents of air on said plane to further dry the same and to effect separation thereof according to differences in specific gravity and in collecting the seeds in separate zones.

5. The hereindescribed process of continuously segregating from a mass of bad viscidulous from good non-viscidulous particles characterized by initially moistening the mixed mass and in introducing thereinto predetermined quantities of dry, finely divided material to effect coating of the viscidulous mass of particles thus changing the specific gravity of said bad seed only, and finally, in depositing all the mixed mass onto an inclined, perforated plane, in causing a continuous current of air to penetrate said plane to provide a supporting cushion above said plane for said mass, in subjecting the mass to intersecting currents of air to aid in the separation of the particles according to differences in specific gravity, in collecting by suction excess and partially dried finely divided material from said plane for return to a point for re-use and finally in collecting the separated particles at different zones as they pass from said plane.

HENRY M. SUTTON.
EDWIN G. STEELE.